(12) United States Patent
Kalra

(10) Patent No.: US 12,077,998 B2
(45) Date of Patent: Sep. 3, 2024

(54) BUTTON ASSEMBLY FOR A RELEASE SYSTEM COMPRISING A RACK GEAR AND A PINION GEAR

(71) Applicant: GM Global Technology Operations LLC, Detroit, MI (US)

(72) Inventor: Avijit Kalra, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 470 days.

(21) Appl. No.: 17/491,706

(22) Filed: Oct. 1, 2021

(65) Prior Publication Data

US 2023/0111658 A1 Apr. 13, 2023

(51) Int. Cl.
| | | |
|---|---|---|
| *E05B 77/22* | (2014.01) | |
| *E05B 79/20* | (2014.01) | |
| *E05B 81/90* | (2014.01) | |
| *E05B 83/36* | (2014.01) | |
| *F16C 1/18* | (2006.01) | |
| *B60J 5/04* | (2006.01) | |

(52) U.S. Cl.
CPC .............. *E05B 81/90* (2013.01); *E05B 77/22* (2013.01); *E05B 79/20* (2013.01); *E05B 83/36* (2013.01); *F16C 1/18* (2013.01); *B60J 5/04* (2013.01)

(58) Field of Classification Search
CPC .......... E05B 81/90; E05B 77/22; E05B 79/20; E05B 83/36; E05B 1/0038; Y10T 403/292; F16C 1/18; F16C 1/223; F16C 2326/01; B60J 5/04
See application file for complete search history.

(56) References Cited

U.S. PATENT DOCUMENTS

| | | | | |
|---|---|---|---|---|
| 5,040,390 A | * | 8/1991 | Mistry ................... | E05B 81/90 292/216 |
| 2006/0178566 A1 | * | 8/2006 | Fetzer .................... | A61B 90/50 600/234 |

* cited by examiner

*Primary Examiner* — Kristina R Fulton
*Assistant Examiner* — Thomas L Neubauer
(74) *Attorney, Agent, or Firm* — Vivacqua Crane, PLLC

(57) ABSTRACT

A button assembly for a release system comprises a housing and an actuator coupled to the housing and translatable along a first axis. The actuator comprises a contact surface configured for engagement by an operator to translate the actuator along the first axis, and a rack gear extending along the first axis and away from the contact surface. The button assembly further comprises a pinion gear coupled to the housing and rotatable about a second axis, orthogonal to the first axis. The pinion gear is meshed with the rack gear and with the extension member coupled to the pinion gear. The mesh between the pinion gear and the rack gear facilitates rotation of the pinion gear as the rack gear translates, with the rotation of the pinion gear facilitating movement of the extension member and movement of the latch between the engagement and disengagement positions.

20 Claims, 5 Drawing Sheets

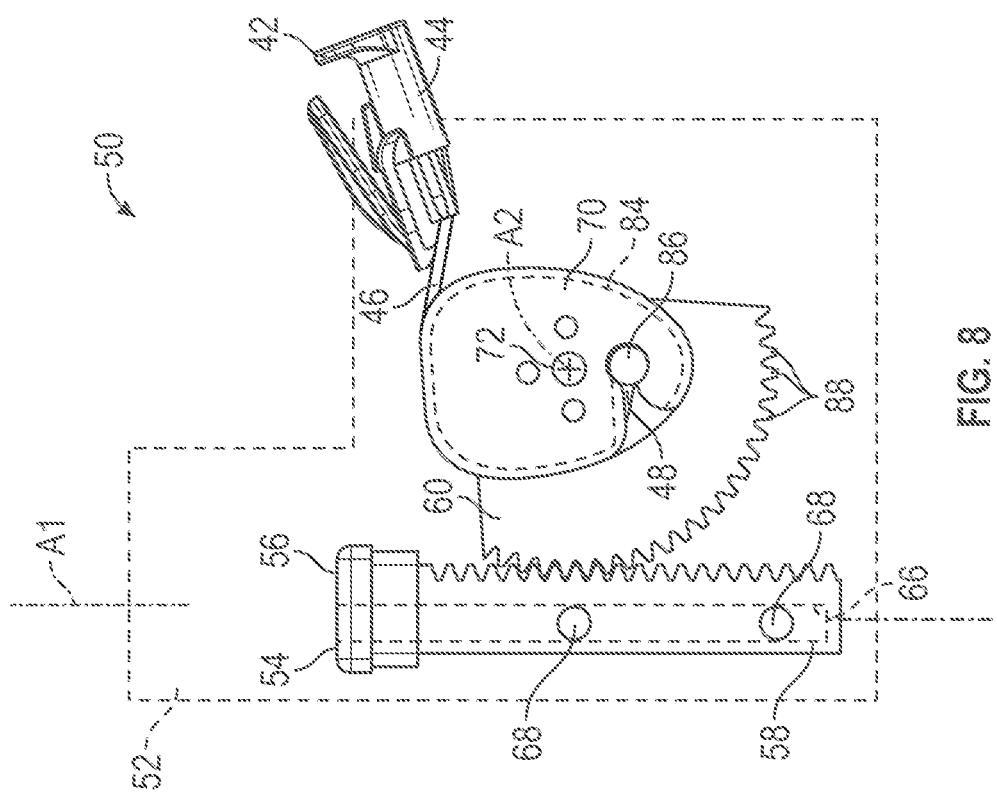
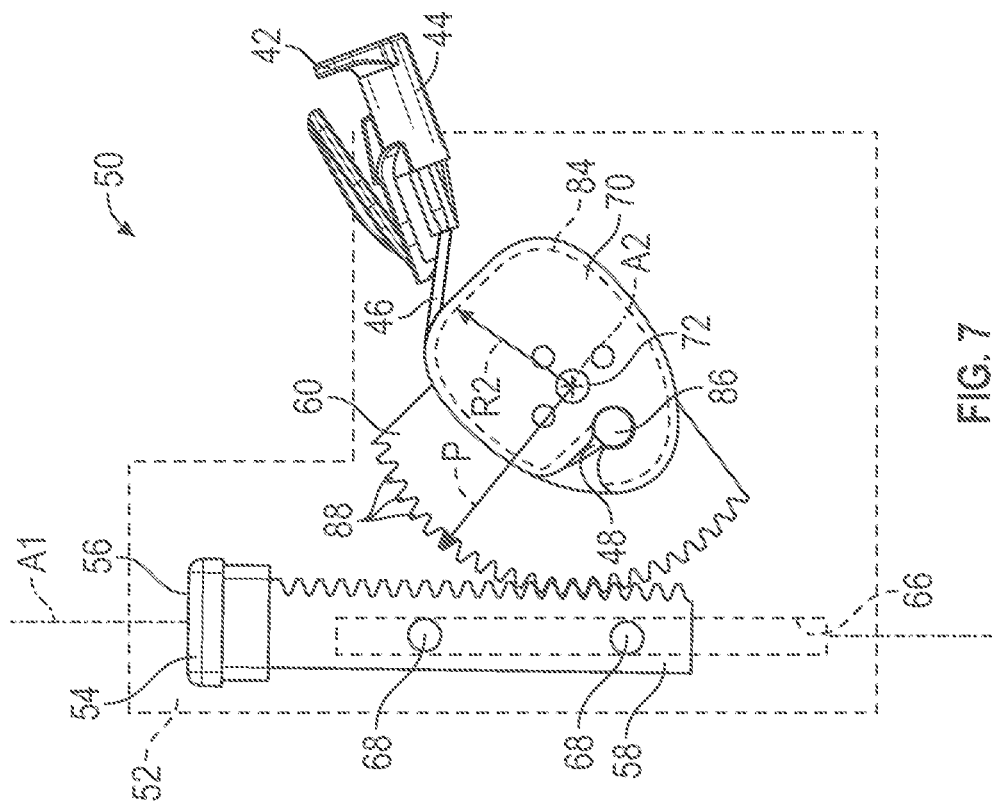

BUTTON ASSEMBLY FOR A RELEASE SYSTEM COMPRISING A RACK GEAR AND A PINION GEAR

INTRODUCTION

The present disclosure relates to a button assembly for a release system, and more particularly to a button assembly comprising a rack gear and a pinion gear.

In recent years, electronic systems have been utilized to a larger degree in automobiles to perform various functions that were traditionally performed by mechanical systems. One such example is the release system used in the door for disengaging a latch mechanism and opening the door. Several modern designs of release systems utilize a button that is electronically connected to the latch mechanism (through a wired connection or through a wireless communication protocol). When the button is pressed by the operator, an electronic signal is sent to the latch mechanism to disengage a striker mounted to the body pillar and permit the door to open. The use of the button presents a modern aesthetic within the vehicle that takes up less area on the surface of the door (compared to a lever-style release) and requires minimal force to actuate. However, if electric continuity is lost, the electronic button will not disengage the latch mechanism to open the door. Therefore, doors that utilize such a system commonly utilize a back-up mechanism to open the door. The back-up mechanism is typically a release lever that is hidden from the common view of the occupant and is mechanically connected to the latch mechanism. While effective, the use of the electronic button system and the back-up mechanism creates a redundancy that increases the overall cost and the complexity of the door.

Thus, while current release systems achieve their intended purpose, there is a need for a new button assembly for a release system that addresses these issues.

SUMMARY

According to several aspects of the present disclosure, A button assembly for a release system is presented. The button assembly comprises a housing and an actuator coupled to the housing and translatable relative to the housing along a first axis. The actuator comprises a contact surface configured for engagement by an operator to translate the actuator along the first axis, and a rack gear extending along the first axis and away from the contact surface. The button assembly further comprises a pinion gear coupled to the housing and rotatable about a second axis, orthogonal to the first axis. The pinion gear is meshed with the rack gear and with the extension member coupled to the pinion gear. The mesh between the pinion gear and the rack gear facilitates rotation of the pinion gear as the rack gear translates, with the rotation of the pinion gear facilitating movement of the extension member and movement of the latch between the engagement and disengagement positions.

In one aspect, the button assembly further comprises a pulley coupled to the pinion gear and rotatable with the pinion gear, wherein rotation of the pulley corresponds with rotation of the pinion gear, with the pulley configured to be coupled to the extension member.

In another aspect, the pulley is fixed to the pinion gear and configured to rotate in unison with the pinion gear about the second axis.

In another aspect, the button assembly further comprises an axle extending along the second axis, with both of the pinion gear and the pulley engaged with the axle to facilitate rotation of the pinion gear and the pulley about the second axis.

In another aspect, the button assembly further comprises a lock pin spaced from the axle and extending parallel to the second axis between the pinion gear and the pulley, with the lock pin in engagement with both of the pinion gear and the pulley to rotationally fix the pinion gear and the pulley.

In another aspect, the housing comprises a wall disposed between the pinion gear and defining a lock pin slot to receive the lock pin therethrough, with the lock pin slot having a semi-annular configuration to facilitate movement of the lock pin around the second axis as the pinion gear and the pulley rotate.

In another aspect, the pulley comprises a cam surface spaced from and extending around the second axis, with the pulley configured to abut the extension member along the cam surface.

In another aspect, the cam surface is spaced from the second axis by a cam radius, with the cam radius varying about the second axis.

In another aspect, the actuator is disposed in a first position when the contact surface is disengaged by the operator and wherein the actuator is disposed in a second position, spaced from the first position, when the contact surface is engaged by the operator. The extension member abuts a first location of the cam surface when the actuator is in the first position, with the cam radius further defined as a first cam radius at the first location. The extension member abuts a second location of the cam surface when the actuator is in the second position, with the cam radius further defined as a second cam radius at the second location. The second cam radius is greater than the first cam radius and facilitates increasing a resistant force exerted on the operator as the actuator translates from the first position to the second position and correspondingly increasing a rotational displacement of the pulley as the actuator translates from the first position to the second position.

In another aspect, the pinion gear comprises a plurality of teeth spaced from the second axis by a pinion radius, with the pinion radius and the first cam radius defining a first ratio between 2:1 and 4:1 and with the pinion radius and the second cam radius defining a second ratio between 0.7:1 and 1.25:1.

In another aspect, the housing defines an interior and an aperture opening into the interior, with the actuator translatable within the interior and with the aperture providing access to the contact surface of the actuator for engagement by the operator.

In another aspect, the housing defines a retention slot longitudinally extending parallel to the first axis and wherein the actuator comprises a protrusion extending from the rack gear and into engagement with the housing within the retention slot, with the retention slot arranged to retain the translation of the actuator to along the first axis.

According to several aspects of the present disclosure, a release system for a vehicle is presented. The release system comprises a latch configured to engage a striker, with the latch movable between an engagement position for abutting the striker and a disengagement position for inhibiting abutment with the striker. The release system further comprises an extension member coupled to the latch, with movement of the extension member configured to move the latch between the engagement and disengagement positions. The release system further comprises a button assembly. The button assembly comprises a housing and an actuator coupled to the housing and translatable relative to the housing along a first axis, with the actuator comprising a contact surface configured for engagement by an operator to translate the actuator along the first axis, and a rack gear extending along the first axis and away from the contact surface. The button assembly further comprises a pinion gear coupled to the housing and rotatable about a second axis, orthogonal to the first axis, with the pinion gear meshed with the rack gear and with the extension member coupled to the pinion gear. The mesh between the pinion gear and the rack gear facilitates rotation of the pinion gear as the rack gear translates, with the rotation of the pinion gear facilitating movement of the extension member and movement of the latch between the engagement and disengagement positions.

In one aspect, the button assembly further comprises a pulley coupled to the pinion gear and rotatable with the pinion gear, wherein rotation of the pulley corresponds with rotation of the pinion gear. The extension member comprises a tube fixed to the housing and a cable extending through and beyond the tube between a pair of ends, with the cable coupled to the latch at one of the pair of ends and with the cable coupled to the pulley at the other one of the pair of ends.

In another aspect, the pulley comprises a cam surface spaced from and extending around the second axis, with the cable configured to lie along at least a portion of the cam surface.

In another aspect, the cam surface is spaced from the second axis by a cam radius, with the cam radius varying about the second axis. The actuator is disposed in a first position when the contact surface is disengaged by the operator. The actuator is disposed in a second position, spaced from the first position, when the contact surface is engaged by the operator. The cable lies along the cam surface to a first location of the cam surface when the actuator is in the first position, with the cam radius further defined as a first cam radius at the first location. The cable lies along the cam surface to a second location of the cam surface when the actuator is in the second position, with the cam radius further defined as a second cam radius at the second location. The second cam radius is greater than the first cam radius and facilitates increasing a resistant force exerted on the operator as the actuator translates from the first position to the second position and correspondingly increasing a rotational displacement of the pulley as the actuator translates from the first position to the second position.

In another aspect, the pinion gear comprises a plurality of teeth spaced from the second axis by a pinion radius, with the pinion radius and the first cam radius defining a first ratio between 2:1 and 4:1 and with the pinion radius and the second cam radius defining a second ratio between 0.7:1 and 1.25:1.

In another aspect, the pulley is fixed to the pinion gear and configured to rotate in unison with the pinion gear about the second axis.

In another aspect, the button assembly further comprises an axle extending along the second axis, with both of the pinion gear and the pulley engaged with the axle to facilitate rotation of the pinion gear and the pulley about the second axis.

According to several aspects of the present disclosure, a door assembly is movably coupled to a vehicle for selectively covering an opening between an interior and an exterior of a vehicle. The door assembly comprises a door having an outer surface facing the exterior of the vehicle and an inner surface facing the interior of the vehicle and a release system. The release system comprises a latch configured to engage a striker fixed to the vehicle, with the latch movable between an engagement position for abutting the striker and retaining the door assembly in a closed position covering the opening, and a disengagement position for inhibiting abutment with the striker and facilitating movement of the door. The release system further comprises an extension member coupled to the latch, with movement of the extension member configured to move the latch between the engagement and disengagement positions. The release system further comprises a button assembly. The button assembly comprises a housing and an actuator coupled to the housing and translatable relative to the housing along a first axis, with the actuator comprising a contact surface disposed along the inner surface of the door and configured for engagement by an operator to translate the actuator along the first axis, and a rack gear extending along the first axis and away from the contact surface. The button assembly further comprises a pinion gear coupled to the housing and rotatable about a second axis, orthogonal to the first axis, with the pinion gear meshed with the rack gear and with the extension member coupled to the pinion gear. The mesh between the pinion gear and the rack gear facilitates rotation of the pinion gear as the rack gear translates, with the rotation of the pinion gear facilitating movement of the extension member and movement of the latch between the engagement and disengagement positions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a side plan view of the button assembly of FIG. 3, with the actuator, the pinion gear, and the pulley disposed in a second position.

FIG. 8 is a side plan view of the button assembly of FIG. 3, with the actuator, the pinion gear, and the pulley disposed in another position with the actuator almost fully pressed.

DETAILED DESCRIPTION

The following description is merely exemplary in nature and is not intended to limit the present disclosure, application, or uses.

Figure 1:
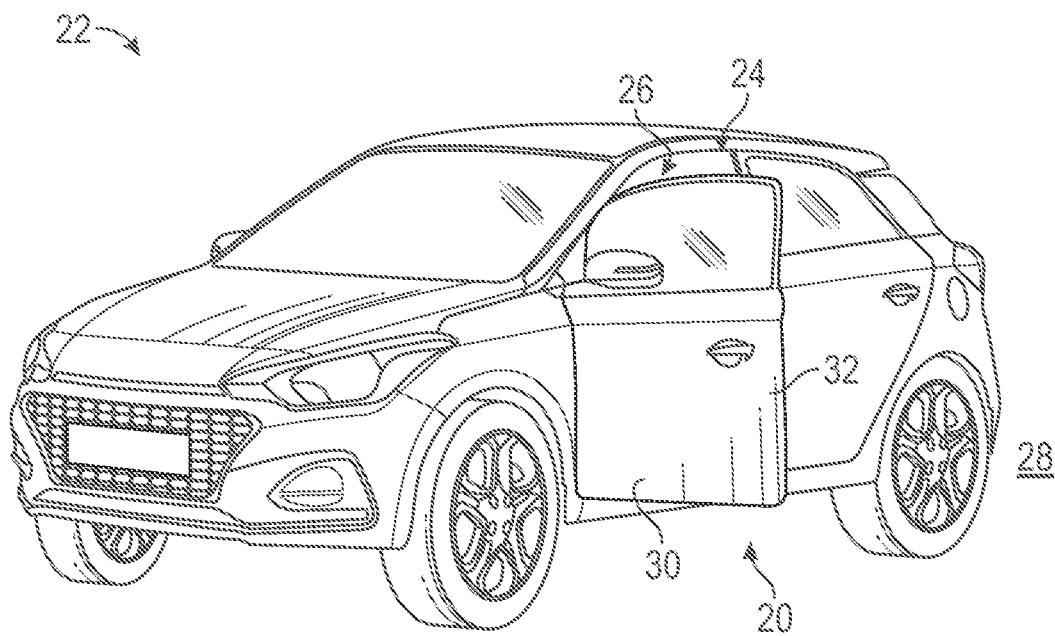
FIG. 1 is a perspective view of one example of a vehicle having a door assembly, with the door assembly open.
Figure 2:
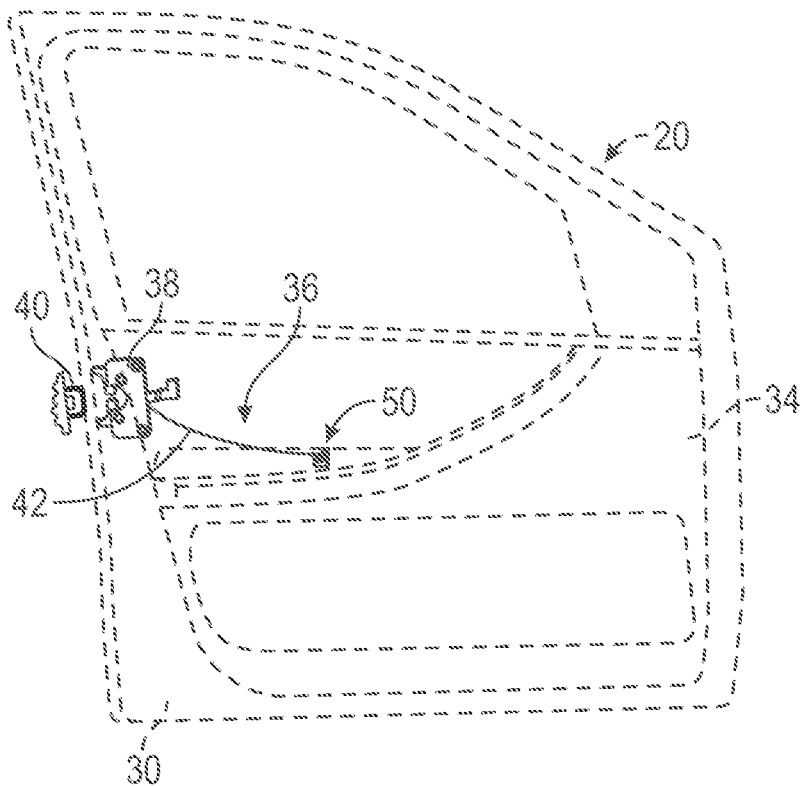
FIG. 2 is a side elevational view of the door assembly of FIG. 1, showing a release system comprising a button assembly, an extension member, and a latch.

Referring to FIGS. 1 and 2, a door assembly 20 is shown generally at 20. The door assembly 20 is movably coupled to a vehicle 22 for selectively covering an opening 24 between an interior 26 and an exterior 28 of the vehicle 22, as shown in FIG. 1. The door assembly 20 comprises a door 30 having an outer surface 32 facing the exterior 28 of the vehicle 22 and an inner surface 34 facing the interior 26 of the vehicle 22. The door assembly 20 further comprises a release system 36 as shown in FIG. 2. The release system 36 comprises a latch 38 configured to engage a striker 40 fixed to the vehicle 22. More specifically the striker 40 is fixed to a body pillar of the vehicle 22. The latch 38 is movable between an engagement position for abutting the striker 40 and retaining the door assembly 20 in a closed position covering the opening 24, and a disengagement position for inhibiting abutment with the striker 40 and facilitating movement of the door assembly 20. More specifically, with the door assembly 20 opened and the latch 38 in the engagement position, the latch 38 may move when contact is made with the striker 40 when closing the door assembly 20 but will return to the engagement position after passing the striker 40. As such, the latch 38 automatically encloses the striker 40 and retains the door assembly 20 in the closed position. When disposed in the disengagement position, the latch 38 is spaced from the striker 40 and will not engage the striker 40. As such, the door assembly 20 may freely move between the open and closed positions. The release system 36 further comprises an extension member 42 coupled to the latch 38, with movement of the extension member 42 configured to move the latch 38 between the engagement and disengagement positions. In the example shown in the Figures, the extension member 42 comprises a tube 44 and a cable 46 extending through and beyond the tube 44 between a pair of ends 48. Such a configuration may be referred to as a Bowden cable and is capable of flexing. However, the extension member 42 may be configured as a linkage having a rigid configuration.

Figure 4:
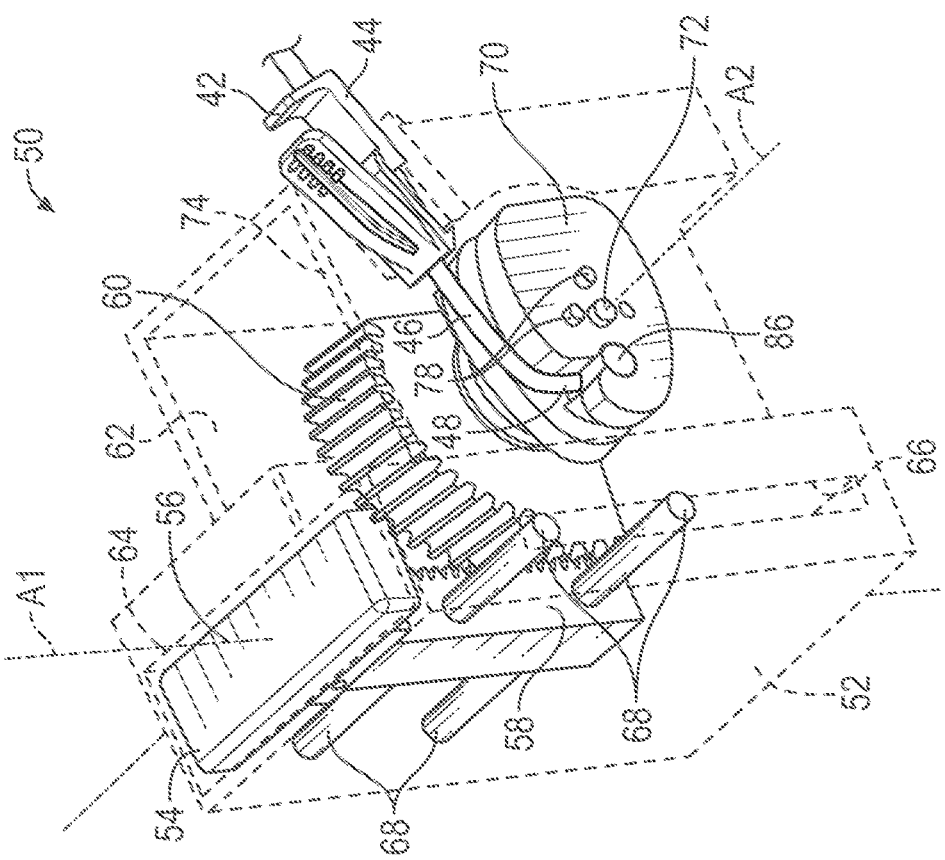
FIG. 4 is a perspective view of the button assembly of FIG. 3, showing a rack gear of the actuator and a pinion gear.
Figure 3:
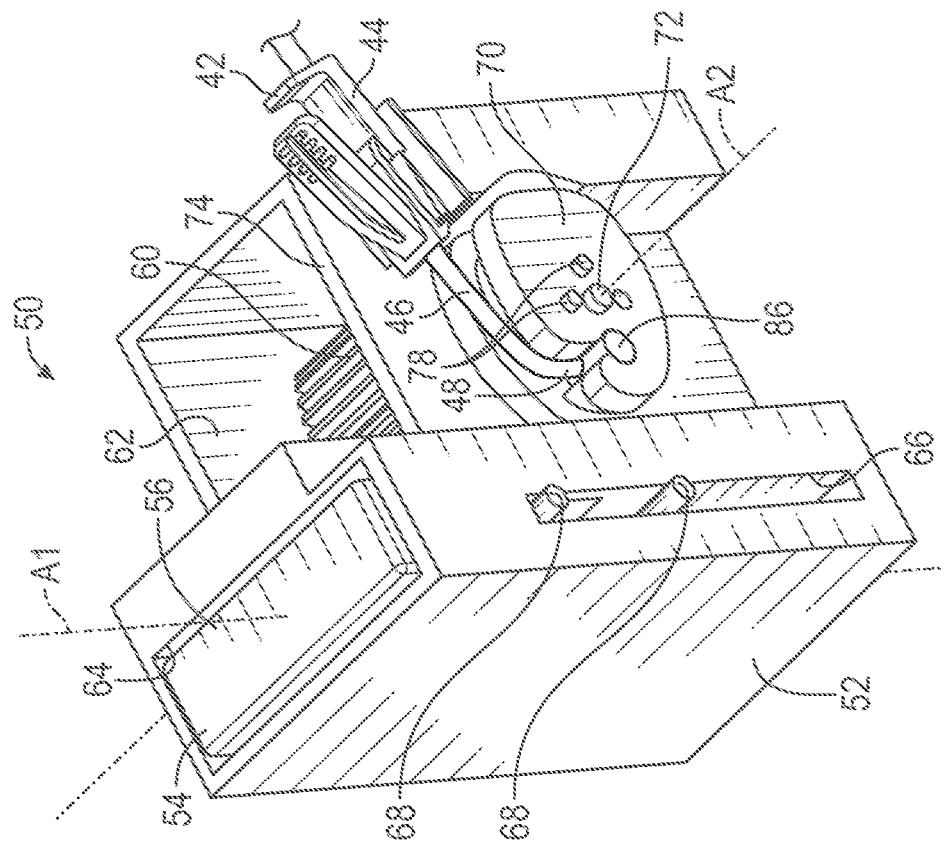
FIG. 3 is a perspective view of one example of the button assembly, showing a pulley and a contact surface of an actuator.
Figure 6:
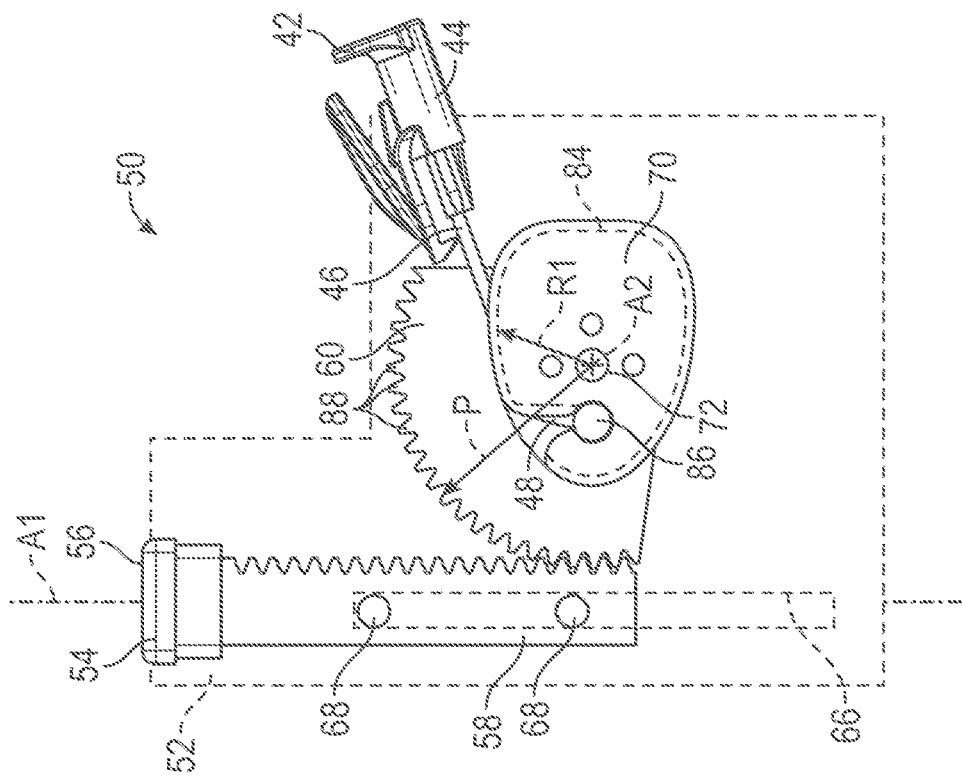
FIG. 6 is a side plan view of the button assembly of FIG. 3, with the actuator, the pinion gear, and the pulley disposed in a first position.
Figure 5:
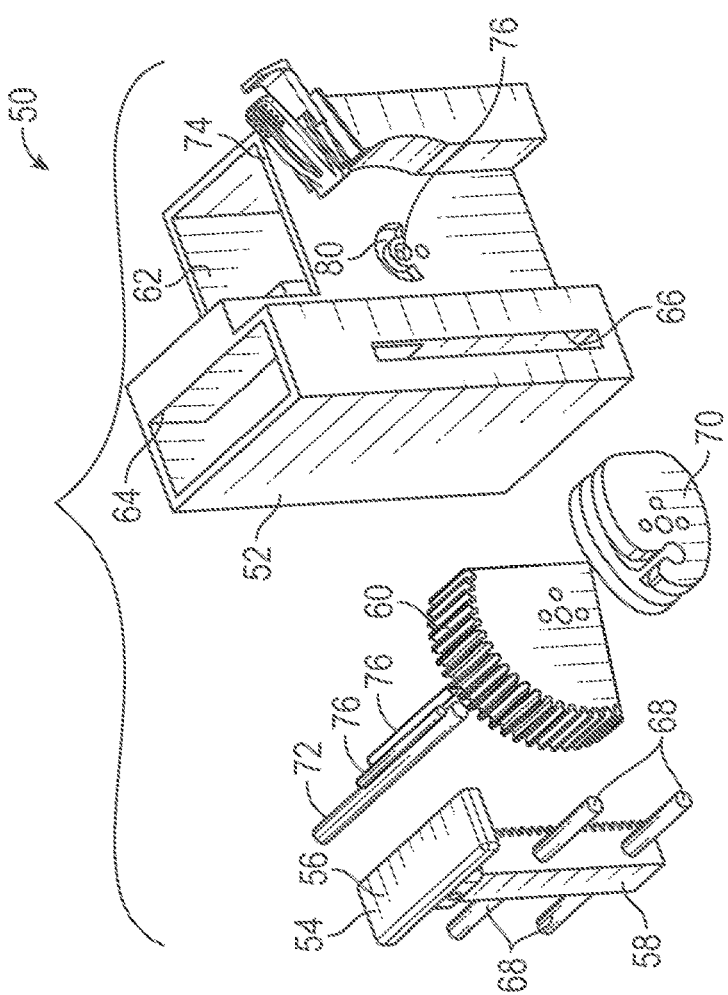
FIG. 5 is an exploded view of the button assembly of FIG. 3.

As shown in FIGS. 3-5, the release system 36 further comprises a button assembly 50. The button assembly 50 comprises a housing 52 and an actuator 54 coupled to the housing 52 and translatable relative to the housing 52 along a first axis A1, with the actuator 54 comprising a contact surface 56 disposed along the inner surface 34 of the door 30 (e.g., along an armrest of the door 30) and configured for engagement by an operator to translate the actuator 54 along the first axis A1, and a rack gear 58 extending along the first axis A1 and away from the contact surface 56. The button assembly 50 further comprises a pinion gear 60 coupled to the housing 52 and rotatable about a second axis A2, orthogonal to the first axis A1, with the pinion gear 60 meshed with the rack gear 58 and with the extension member 42 coupled to the pinion gear 60. The mesh between the pinion gear 60 and the rack gear 58 facilitates rotation of the pinion gear 60 as the rack gear 58 translates, with the rotation of the pinion gear 60 facilitating movement of the extension member 42 and movement of the latch 38 between the engagement and disengagement positions. More specifically, the operator presses the contact surface 56 and translates the actuator 54. As shown in FIGS. 6-8, translation of the actuator 54 causes the cable 46 to move, which in-turn moves the latch 38 between the engagement and disengagement positions. With the door assembly 20 in the closed position, pressing the actuator 54 causes the latch 38 to move from the engagement position to the disengagement position, which allows the door assembly 20 to move from the closed position to the open position. The operator may release the actuator 54. The latch 38 may be internally biased to move the latch 38 from the disengagement position to the engagement position. The internal bias may also correspondingly move the cable 46, which may translate the actuator 54 back to the original position (referred to hereinafter as a first position of the actuator 54) prior to being pressed by the operator (e.g., the contact surface 56 being disposed along the inner surface 34 of the door 30). In addition to the internal bias of the latch 38, or in the alternative, the actuator 54 may be biased through the use of springs, as shown in FIG. 9.

Although not shown, the latch 38 may incorporate a lock mechanism to prevent inadvertent opening of the door assembly 20 when the actuator 54 is moved. Such prevention is desirable when the vehicle 22 is in motion to prevent the occupant (or other passengers) from accidentally falling out of the vehicle 22. When locked, a single translation of the actuator 54 cannot move the latch 38 from the engagement position to the disengagement position. The latch 38 must be unlocked to permit movement from the engagement position to the disengagement position. The latch 38 may be unlocked by actuating a button, switch, toggle, etc. that is separate from the button assembly 50. Alternatively, the release system 36 may be configured to unlock the latch 38 and move the latch 38 from the engagement position to the disengagement position using separate motions of the button assembly 50. In one example, the operator may press and translate the actuator 54 to unlock the latch 38. The operator may remove pressure from the actuator 54 and the actuator 54 will return to the first position (as described above). The operator may then press and translate the actuator 54 again to move the latch 38 from the engagement position to the disengagement position.

As shown in FIGS. 3-5, the housing 52 may define an interior 62 and an aperture 64 opening into the interior 62, with the actuator 54 translatable within the interior 62 and with the aperture 64 providing access to the contact surface 56 of the actuator 54 for engagement by the operator. In the examples shown in FIGS. 3 and 9, the contact surface 56 is flush with aperture 64 in the first position. However, the contact surface 56 may be spaced from aperture 64 in either direction along the first axis A1 in the first position. As shown in FIGS. 3 and 4, the housing 52 may further define a retention slot 66 longitudinally extending parallel to the first axis A1. The actuator 54 may comprise a protrusion 68 extending from the rack gear 58 and into engagement with the housing 52 within the retention slot 66, with the retention slot 66 arranged to retain the translation of the actuator 54 to along the first axis A1. More specifically, the protrusion 68 engages sides of the retention slot 66 to guide the movement of the actuator 54. The housing 52 may define a second retention slot 66 on an opposing side of the actuator 54 and parallel to the other retention slot 66, as shown in FIG. 4. The protrusion 68 (configured as a pin) extends through the actuator 54 and into the second retention slot 66. Alternatively, a separate protrusion 68 may extend into the second retention slot 66. The retention slots 66 prevent the actuator 54 from rotating about the first axis A1. The actuator 54 may comprise a second protrusion 68 extending from the rack gear 58 and into engagement with the housing 52 within the retention slot 66 (more specifically, two protrusions 68 in each of the retention slots 66). The protrusions 68 engage the housing 52 and prevent the actuator 54 from tipping relative to the first axis A1. As such, translation of the actuator 54 along the first axis A1 is maintained.

Figure 9:
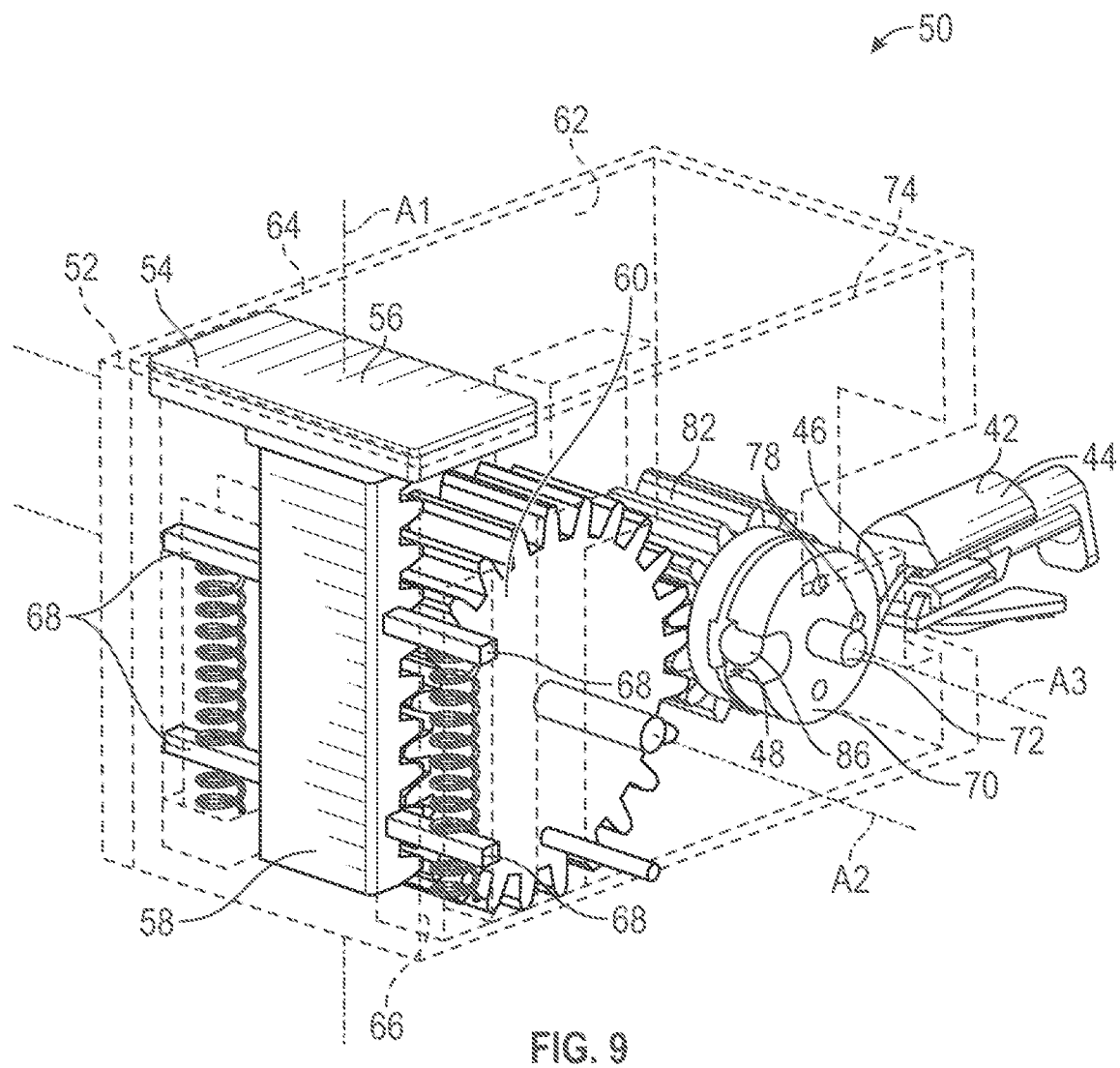
FIG. 9 is a perspective view of another example of the button assembly, showing an idler gear.

As shown in FIGS. 3 and 9, the tube 44 of the extension member 42 may be fixed to the housing 52. The button assembly 50 may further comprise a pulley 70 coupled to the pinion gear 60 and rotatable with the pinion gear 60. Rotation of the pulley 70 corresponds with rotation of the pinion gear 60. The pulley 70 is configured to be coupled to the extension member 42. More specifically, the cable 46 is coupled to the latch 38 at one of the pair of ends 48 and coupled to the pulley 70 at the other one of the pair of ends 48.

In the examples shown in FIGS. 3 and 9, the pulley 70 is fixed to the pinion gear 60 and configured to rotate in unison with the pinion gear 60 about the second axis A2. The button assembly 50 may further comprise an axle 72 extending along the second axis A2, with both of the pinion gear 60 and the pulley 70 engaged with the axle 72 to facilitate rotation of the pinion gear 60 and the pulley 70 about the second axis A2. As shown in FIG. 5, the housing 52 may comprise a wall 74 disposed between the pinion gear 60 and defining a hole 76, with the axle 72 extending through the hole 76. The pinion gear 60 and the pulley 70 may be fixed to the axle 72, with the axle 72 rotatable within the hole 76 about the second axis A2. Alternatively, the axle 72 may be fixed to the housing 52 within the hole 76 (e.g., press fit) with the pinion gear 60 and the pulley 70 rotatable about the axle 72. Although not shown, the axle 72 may be integrally formed with the housing 52 with the pinion gear 60 and the pulley 70 rotatably disposed on the axle 72. The button assembly 50 may further comprise a lock pin 78 spaced from the axle 72 and extending parallel to the second axis A2 between the pinion gear 60 and the pulley 70, with the lock pin 78 in engagement with both of the pinion gear 60 and the pulley 70 to rotationally fix the pinion gear 60 and the pulley 70. The lock pin 78 prevents inadvertent independent rotation of the pinion gear 60 and the pulley 70 in the event that the pinion gear 60 and the pulley 70 may rotate about the axle 72. The wall 74 may define a lock pin slot 80 to receive the lock pin 78 therethrough. As shown in FIG. 5, the lock pin slot 80 has a semi-annular configuration to facilitate movement of the lock pin 78 around the second axis A2 as the pinion gear 60 and the pulley 70 rotate. More specifically, the semi-annular configuration is disposed at a radius relative to the second axis A2 that is equal to a distance between the second axis A2 and the lock pin 78 to facilitate movement of the lock pin 78 within the lock pin slot 80 as the pinion gear 60 and the pulley 70 rotate. As shown in the Figures, numerous lock pins 78 may be utilized between the pinion gear 60 and the pulley 70.

In the example shown in FIG. 9, the button assembly 50 further comprises an idler gear 82 meshed with the pinion gear 60 and rotatable about a third axis A3, parallel to the second axis A2. The pulley 70 is fixed to the idler gear 82 such that the pulley 70 and the idle gear rotate in unison about the third axis A3. The pulley 70 is coupled to, and rotates with, the pinion gear 60 through the idler gear 82. The rotation of the idler gear 82 and the pulley 70 is opposite that of the pinion gear 60.

As shown in FIGS. 6-8, the pulley 70 comprises a cam surface 84 spaced from and extending around the second axis A2, with the pulley 70 configured to abut the extension member 42 along the cam surface 84. In the examples shown in the Figures, the cable 46 is configured to lie along at least a portion of the cam surface 84. More specifically, an anchor 86 at the end 48 of the cable 46 is coupled to the pulley 70, with the cable 46 wrapping around the pulley 70 along the cam surface 84. Rotation of the pulley 70 in one direction wraps more of the cable 46 around the pulley along the cam surface 84 (i.e., takes up the cable 46) and moves the cable in one direction relative to the latch 38. Rotation of the pulley in the opposite direction unwraps the cable 46 from around the pulley along the cam surface 84 (i.e., lets out the cable 46) and moves the cable in the opposite direction relative to the latch 38. The cam surface 84 is spaced from the second axis A2 by a cam radius R, with the cam radius R varying about the second axis A2.

The actuator 54 is disposed in the first position when the contact surface 56 is disengaged by the operator (see FIG. 6). The actuator 54 may be disposed in a second position, spaced from the first position, when the contact surface 56 is engaged by the operator (see FIG. 7). More specifically, the operator may engage the contact surface 56 in the first position and press the actuator 54, causing the actuator 54 to translate along the first axis A1. The translation of the rack gear 58 causes rotation of the pinion gear 60 (through the mesh with the rack gear 58), about the second axis A2. Because the pulley 70 is fixed to the pinion gear 60, the pulley 70 rotates in unison with the pinion gear 60 until the second position is reached.

The extension member 42 abuts a first location of the cam surface 84 when the actuator 54 is in the first position, with the cam radius R further defined as a first cam radius R1 at the first location (see FIG. 6). More specifically, the cable 46 lies along the cam surface 84 to the first location of the cam surface 84 when the actuator 54 is in the first position. The extension member 42 abuts a second location of the cam surface 84 when the actuator 54 is in the second position, with the cam radius R further defined as a second cam radius R2 at the second location (see FIG. 7). More specifically, the cable 46 lies along the cam surface 84 to the second location of the cam surface 84 when the actuator 54 is in the second position. The second cam radius R2 is greater than the first cam radius R1 and facilitates increasing a resistant force exerted on the operator as the actuator 54 translates from the first position to the second position and correspondingly increasing a rotational displacement of the pulley 70 as the actuator 54 translates from the first position to the second position. The change in the cam radius R from the first cam radius R1 to the second radius (i.e., the increase) changes a proportional relationship between the pulley 70 and the pinion gear 60. More specifically, the pinion gear 60 comprises a plurality of teeth 88 spaced from the second axis A2 by a pinion radius P. The pinion radius P and the first cam radius R1 define a first ratio. In one example, the first ratio is between 2:1 and 4:1. The pinion radius P and the second cam radius R2 define a second ratio. In one example, the second ratio is between 0.7:1 and 1.25:1. As such, the first ratio is higher than the second ratio. The higher the ratio, the greater the mechanical advantage that the pinion gear 60 can exert on the cable 46 through the pulley 70. However, the greater the mechanical advantage, the lesser the movement of the cable 46. As such, as the operator moves the actuator 54 from the first position to the second position, the operator experiences a low initial force to move the actuator 54 that increases to the second position. Furthermore, because the actuator 54 is in motion, the inertia of the actuator 54 reduces some of the force felt by occupant, which is advantageous as the required force becomes greater toward the second position. However, the low initial force from the higher ratio causes lesser movement of the cable 46. As such, the movement of the cable 46 begins slow at the first position and increases to the second position. Therefore, the majority of the movement that occurs in the cable 46 to move the latch 38 occurs near the second position. The difference between the first and second ratios balances the force felt by the operator to translate the actuator 54 with the distance that the actuator 54 must translate into a desirable tactile profile.

The button assembly 50 shown in FIG. 7 is one example of the second position. It is to be appreciated that the second position may refer to any translational position of the actuator 54 along the first axis A1 and any rotational position of the pinion gear 60 and the pulley 70 about the second axis A2 (other than the translational and rotational positions of the first position) in which the second cam radius R2 is greater than the first cam radius R1. FIG. 8 shows the button assembly 50 in another position in which the actuator 54 is almost fully pressed. More specifically, when fully pressed the actuator 54 is translated along the axis until the protrusion 68 contacts the housing 52 at the end of the retention slot 66, acting as a hard stop for the actuator 54. The position in FIG. 8 could be categorized as the second position. In one example, the position of the button assembly 50 in FIG. 7 corresponds with the disengagement position of the latch 38 while the button assembly 50 in FIG. 8 corresponds with unlocking the latch 38 (described above). As such, with the latch 38 in the engagement position and locked, and with the door assembly 20 in the closed position, the operator may engage the contact surface 56 (see FIG. 6) and press the contact surface 56 to translate the actuator 54 to the position shown in FIG. 8 to unlock the latch 38. The operator may then remove pressure from the actuator 54 and the actuator 54 will return to the first position shown in FIG. 6. The operator may then press and translate the actuator 54 again to the position shown in FIG. 7 to move the latch 38 from the engagement position to the disengagement position. The change in the ratios allows the two presses of the actuator 54 to feel similar to the operator while allowing the button assembly 50 to displace more of the cable 46 to unlock the latch 38 during the first press than during the second press to move the latch 38 to the disengagement position.

Although the first and second positions (and the corresponding first cam radius R1 and second cam radius R2) are discussed in detail, it is to be appreciated that infinite positions of the button assembly 50 are available between the first and second positions, as well as beyond the second position to a fully pressed position. Furthermore, the cam radius R may vary between those infinite positions. As such, the profile of the cam surface 84 may vary between different configurations.

Accordingly, the button assembly 50 offers several advantages. The button assembly 50 provides an aesthetically pleasing mechanism to be actuated by the operator, similar to electronic button systems, but utilizes a mechanical connection to the latch 38 in the release system 36. As such, the release system 36 provides a robust and consistent actuation of the latch 38 that is not susceptible to loss of power continuity. Furthermore, the release system 36 eliminates the need for a redundant mechanical system to actuate the latch 38 in the event that electric continuity is lost, which reduces the overall cost of the door assembly.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An assembly for a release system, the assembly comprising:
    a housing;
    an actuator coupled to the housing and translatable relative to the housing along a first axis, with the actuator comprising a contact surface configured for engagement by an operator to translate the actuator along the first axis, and a rack gear extending along the first axis and away from the contact surface;
    a pinion gear coupled to the housing and rotatable about a second axis, orthogonal to the first axis, with the pinion gear meshed with the rack gear and with an extension member coupled to the pinion gear; and
    a pulley coupled to the pinion gear and rotatable with the pinion gear, wherein rotation of the pulley corresponds with rotation of the pinion gear; and wherein the extension member comprises a tube fixed to the housing and a cable extending through and beyond the tube between a pair of ends, with the cable coupled to a latch of the release system at one of the pair of ends and with the cable coupled to the pulley at the other one of the pair of ends, and
    wherein the mesh between the pinion gear and the rack gear facilitates rotation of the pinion gear as the rack gear translates, with the rotation of the pinion gear facilitating movement of the extension member and movement of the latch between the engagement and disengagement positions.

2. The assembly of claim 1, wherein the pulley is fixed to the pinion gear and configured to rotate in unison with the pinion gear about the second axis.

3. The assembly of claim 2, further comprising an axle extending along the second axis, with both of the pinion gear and the pulley engaged with the axle to facilitate rotation of the pinion gear and the pulley about the second axis.

4. The assembly of claim 3, further comprising a lock pin spaced from the axle and extending parallel to the second axis between the pinion gear and the pulley, with the lock pin in engagement with both of the pinion gear and the pulley to rotationally fix the pinion gear and the pulley.

5. The assembly of claim 4, wherein the housing comprises a wall disposed between the pinion gear and defining a lock pin slot to receive the lock pin therethrough, with the lock pin slot having a semi-annular configuration to facilitate movement of the lock pin around the second axis as the pinion gear and the pulley rotate.

6. The assembly of claim 1, wherein the pulley comprises a cam surface spaced from and extending around the second axis, with the pulley configured to abut the extension member along the cam surface.

7. The assembly of claim 6, wherein the cam surface is spaced from the second axis by a cam radius, with the cam radius varying about the second axis.

8. The assembly of claim 7, wherein the actuator is disposed in a first position when the contact surface is disengaged by the operator and wherein the actuator is disposed in a second position, spaced from the first position, when the contact surface is engaged by the operator;
    wherein the extension member abuts a first location of the cam surface when the actuator is in the first position, with the cam radius further defined as a first cam radius at the first location;
    wherein the extension member abuts a second location of the cam surface when the actuator is in the second position, with the cam radius further defined as a second cam radius at the second location; and
    wherein the second cam radius is greater than the first cam radius and facilitates increasing a resistant force exerted on the operator as the actuator translates from the first position to the second position and correspondingly increasing a rotational displacement of the pulley as the actuator translates from the first position to the second position.

9. The assembly of claim 8, wherein the pinion gear comprises a plurality of teeth spaced from the second axis by a pinion radius, with the pinion radius and the first cam radius defining a first ratio between 2:1 and 4:1 and with the pinion radius and the second cam radius defining a second ratio between 0.7:1 and 1.25:1.

10. The assembly of claim 1, wherein the housing defines an interior and an aperture opening into the interior, with the actuator translatable within the interior and with the aperture providing access to the contact surface of the actuator for engagement by the operator.

11. The assembly of claim 10, wherein the housing defines a retention slot longitudinally extending parallel to the first axis and wherein the actuator comprises a protrusion extending from the rack gear and into engagement with the housing within the retention slot, with the retention slot arranged to retain the translation of the actuator to along the first axis.

12. A release system for a vehicle, comprising:
a latch configured to engage a striker, with the latch movable between an engagement position for abutting the striker and a disengagement position for inhibiting abutment with the striker;
an extension member coupled to the latch, with movement of the extension member configured to move the latch between the engagement and disengagement positions; and
an assembly comprising:
a housing;
an actuator coupled to the housing and translatable relative to the housing along a first axis, with the actuator comprising a contact surface configured for engagement by an operator to translate the actuator along the first axis, and a rack gear extending along the first axis and away from the contact surface;
a pinion gear coupled to the housing and rotatable about a second axis, orthogonal to the first axis, with the pinion gear meshed with the rack gear and with the extension member coupled to the pinion gear; and
a pulley coupled to the pinion gear and rotatable with the pinion gear, wherein rotation of the pulley corresponds with rotation of the pinion gear,
wherein the extension member comprises a tube fixed to the housing and a cable extending through and beyond the tube between a pair of ends, with the cable coupled to the latch at one of the pair of ends and with the cable coupled to the pulley at the other one of the pair of ends, and
wherein the mesh between the pinion gear and the rack gear facilitates rotation of the pinion gear as the rack gear translates, with the rotation of the pinion gear facilitating movement of the extension member and movement of the latch between the engagement and disengagement positions.

13. The release system of claim 12, wherein the pulley comprises a cam surface spaced from and extending around the second axis, with the cable configured to lie along at least a portion of the cam surface.

14. The release system of claim 13, wherein the cam surface is spaced from the second axis by a cam radius, with the cam radius varying about the second axis;
wherein the actuator is disposed in a first position when the contact surface is disengaged by the operator and wherein the actuator is disposed in a second position, spaced from the first position, when the contact surface is engaged by the operator;
wherein the cable lies along the cam surface to a first location of the cam surface when the actuator is in the first position, with the cam radius further defined as a first cam radius at the first location;
wherein the cable lies along the cam surface to a second location of the cam surface when the actuator is in the second position, with the cam radius further defined as a second cam radius at the second location; and
wherein the second cam radius is greater than the first cam radius and facilitates increasing a resistant force exerted on the operator as the actuator translates from the first position to the second position and correspondingly increasing a rotational displacement of the pulley as the actuator translates from the first position to the second position.

15. The release system of claim 14, wherein the pinion gear comprises a plurality of teeth spaced from the second axis by a pinion radius, with the pinion radius and the first cam radius defining a first ratio between 2:1 and 4:1 and with the pinion radius and the second cam radius defining a second ratio between 0.7:1 and 1.25:1.

16. The release system of claim 12, wherein the pulley is fixed to the pinion gear and configured to rotate in unison with the pinion gear about the second axis.

17. The release system of claim 16, wherein the assembly further comprises an axle extending along the second axis, with both of the pinion gear and the pulley engaged with the axle to facilitate rotation of the pinion gear and the pulley about the second axis.

18. A door assembly movably coupled to a vehicle for selectively covering an opening between an interior and an exterior of a vehicle, the door assembly comprising:
a door having an outer surface facing the exterior of the vehicle and an inner surface facing the interior of the vehicle; and
a release system comprising:
a latch configured to engage a striker fixed to the vehicle, with the latch movable between an engagement position for abutting the striker and retaining the door assembly in a closed position covering the opening, and a disengagement position for inhibiting abutment with the striker and facilitating movement of the door;
an extension member coupled to the latch, with movement of the extension member configured to move the latch between the engagement and disengagement positions; and
an assembly comprising:
a housing;
an actuator coupled to the housing and translatable relative to the housing along a first axis between a first position and a second position, with the actuator comprising a contact surface disposed along the inner surface of the door and configured for engagement by an operator to translate the actuator along the first axis, and a rack gear extending along the first axis and away from the contact surface;
a pinion gear coupled to the housing and rotatable about a second axis, orthogonal to the first axis, with the pinion gear meshed with the rack gear and with the extension member coupled to the pinion gear; and a pulley coupled to the pinion gear and rotatable with the pinion gear, wherein rotation of the pulley corresponds with rotation of the pinion gear, wherein the extension member comprises a tube fixed to the housing and a cable extending through and beyond the tube between a pair of ends, with the cable coupled to the latch at one of the pair of ends and with the cable coupled to the pulley at the other one of the pair of ends, and wherein the mesh between the pinion gear and the rack gear facilitates rotation of the pinion gear as the rack gear translates, with the rotation of the pinion gear facilitating movement of the extension member and movement of the latch between the engagement and disengagement positions.

19. The door assembly of claim 18, wherein the cable lies along a first cam surface having a first cam radius when the actuator is in the first position; and wherein the cable lies along a second cam surface having a second cam radius when the actuator is in the second position.

20. The door assembly of claim 19, wherein the pinion gear comprises a plurality of teeth spaced from the second axis by a pinion radius, with the pinion radius and the first cam radius defining a first ratio between 2:1 and 4:1 and the pinion radius and the second cam radius defining a second ratio between 0.7:1 and 1.25:1.

\* \* \* \* \*